(12) United States Patent
Hartman

(10) Patent No.: US 9,148,197 B1
(45) Date of Patent: Sep. 29, 2015

(54) TECHNIQUES FOR GENERATING AN OPTIMIZED CHANNEL HOPPING SEQUENCE

(71) Applicant: Landis+Gyr Innovations, Inc., Alpharetta, GA (US)

(72) Inventor: James Hartman, Canton, GA (US)

(73) Assignee: Landis+Gyr Innovations, Inc., Alpharetta, GA (US)

( * ) Notice: Subject to any disclaimer, the term of this patent is extended or adjusted under 35 U.S.C. 154(b) by 0 days.

(21) Appl. No.: 14/511,630

(22) Filed: Oct. 10, 2014

(51) Int. Cl.
*H04B 1/00* (2006.01)
*H04B 1/715* (2011.01)
*H04B 1/7136* (2011.01)

(52) U.S. Cl.
CPC .............. *H04B 1/715* (2013.01); *H04B 1/7136* (2013.01); *H04B 2001/7154* (2013.01)

(58) Field of Classification Search
CPC .............................. H04B 1/715; H04B 1/7136
See application file for complete search history.

(56) References Cited

U.S. PATENT DOCUMENTS

| | | | | |
|---|---|---|---|---|
| 5,442,659 | A | * | 8/1995 | Bauchot et al. ............... 375/134 |
| 2005/0272436 | A1 | * | 12/2005 | Trott et al. .................... 455/450 |
| 2006/0029018 | A1 | * | 2/2006 | Mizukami et al. ............ 370/328 |
| 2010/0226342 | A1 | * | 9/2010 | Colling et al. ................ 370/336 |

OTHER PUBLICATIONS

Kang et al., "IEEE 802.15-08-409-04-004e; Time Slotted, Channel Hopping MAC Proposal", Jul. 2008, 33 pages.

* cited by examiner

*Primary Examiner* — Jaison Joseph
(74) *Attorney, Agent, or Firm* — Kilpatrick Townsend & Stockton LLP

(57) ABSTRACT

Disclosed are various embodiments for optimizing a hopping sequence for a network. A network device generates sequences of channel numbers based at least in part upon a seed value. The network device concatenates the sequences into the hopping sequence, wherein each of the sequences is a segment of the hopping sequence. The network device adjusts the position of any adjacent repeating channel numbers within the hopping sequence to separate the channel numbers. The network device configures its network interface using the hopping sequence in order to communicate via the network.

20 Claims, 5 Drawing Sheets

Hopping Sequence Adjusted to Eliminate Adjacent Repeating Channels

| 4 | 5 | 7 | 6 |    Sequence 1

| 6 | 4 | 5 | 7 |    Sequence 2

| 7 | 6 | 5 | 4 |    Sequence 3

FIG. 2

| Segment 1 | Segment 2 | Segment 3 |
|---|---|---|
| 4 5 7 6 | 6 4 5 7 | 7 6 5 4 |

Position   1  2  3  4 | 5  6  7  8 | 9  10  11  12

Sequences Concatenated into a Hopping Sequence w/ Adjacent Repeating Channels

FIG. 3

| Segment 1 | Segment 2 | Segment 3 |
|---|---|---|
| 4  5  6  7 | 6  4  7  5 | 7  6  4  5 |

Position   1  2  3  4 | 5  6  7  8 | 9  10  11  12

Hopping Sequence Adjusted to Eliminate Adjacent Repeating Channels

FIG. 4

TECHNIQUES FOR GENERATING AN OPTIMIZED CHANNEL HOPPING SEQUENCE

BACKGROUND

Mesh networks, such as a time synchronous channel hopping (TSCH) network, periodically change the frequency channel on which devices that are active on the network transmit or receive data. The devices that are active on a given network are each configured with a predefined channel hopping sequence (or simply "hopping sequence") that specifies the sequence of channels to be used for network communications. Once the end of the hopping sequence has been reached, the devices of the network may repeat the hopping sequence from the beginning. Using short and/or predictable channel hopping sequences may make it difficult for nodes to discover neighboring networks, as well as result in an increased likelihood of radio interference. Using longer channel hopping sequences may improve the likelihood of discovering a neighboring network, but may include adjacent channels that repeat, which may increase the likelihood of radio interference.

SUMMARY

Various aspects of the present invention relate to generating an optimized channel hopping sequence (or simply "hopping sequence") for use in a network. In one implementation, the node generates sequences of channel numbers based at least in part upon a seed value. The seed value may be received as part of a beacon or other type of status data received via the network. The network may be a TSCH network, such as described by IEEE 802.15.4 family of standards. The sequences may have one or more characteristics such as a minimum length, not repeating a channel within a sequence, using a different seed value for each sequence, etc. The node concatenates the sequences into a hopping sequence. Each of the sequences that together form the hopping sequence may be referred to as a "segment" of the hopping sequence.

The node then adjusts the endpoints of the hopping sequence when a first position of the hopping sequence is the same channel number as a last position of the hopping sequence. Adjusting the endpoints includes swapping either a first two positions in a first segment of the hopping sequence or a last two positions in a last segment of the hopping sequence.

One or more of the segment boundary points in the hopping sequence are adjusted when a last position in the one segment of the hopping sequence is the same channel number as a first position in the next segment of the hopping sequence. The adjustment of the one or more segment boundary points of the hopping sequence includes swapping either a last two positions in one segment of the hopping sequence or a first two positions in a next segment of the hopping sequence. The node may examine all of the boundary points in the hopping sequence to determine if adjustment is needed. The node configures its network interface using the hopping sequence in order to communicate via the network. Instead of configuring the network interface, the node may store the channel hopping sequence for possible later use in configuring the network interface.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIGS. 2-4 are drawings of various sequences illustrating the operations that may be used to create a channel hopping sequence according to various embodiments of the present disclosure.

DETAILED DESCRIPTION

Figure 1:
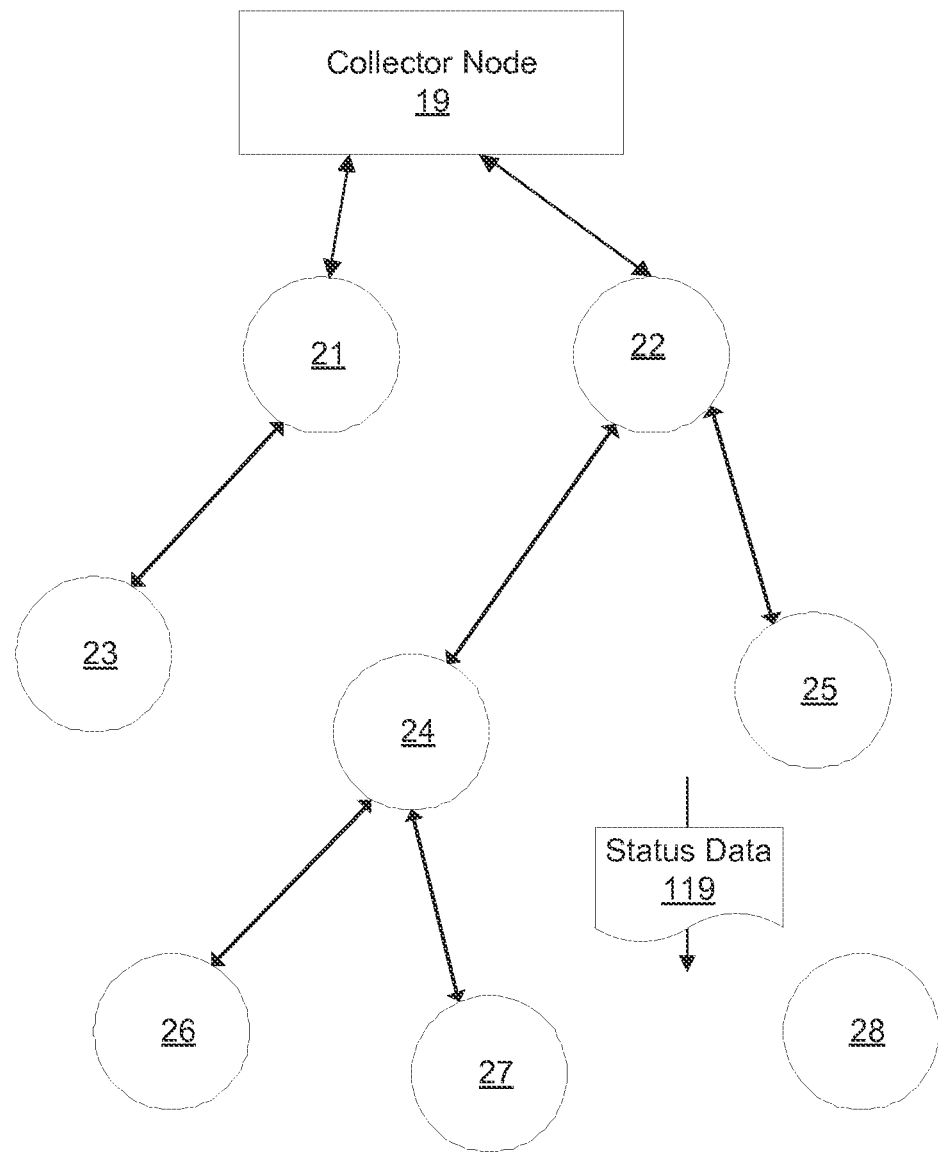
FIG. 1 is a drawing of a mesh network according to various embodiments of the present disclosure.

The present invention is directed to systems and methods for generating an optimized channel hopping sequence for use in a network. A network device, such as a node or a collector, generates sequences of channel numbers based at least in part upon a seed value. The network device concatenates the sequences into a hopping sequence, where each of the sequences is a segment of the hopping sequence. The positions of the hopping sequence at the endpoints and one or more boundary points between the segments are examined to determine if the same channel number appears in adjacent positions. If so, the position of at least one of the adjacent repeating channel numbers is adjusted to separate the channel numbers. Thereafter, the network device may store and/or use the hopping sequence to configure its network interface in order to communicate via the network.

As defined herein, a "node" includes an intelligent device capable of performing functions related to distributing messages in a mesh network. In one system, a node can be a meter located at a facility, such as a house or apartment that measures the consumption of a resource such as gas, water, or electric power. Such a meter can be part of an advanced metering infrastructure (AMI), radio frequency (RF) network. Other examples of nodes include a router, collector or collection point, host computer, hub, or other computing device that is attached to a network and is capable of sending, receiving, or forwarding information over a communications channel.

A node can contain several components that enable it to function within implementations of the present invention. For example, a node can include a radio that can enable it to communicate with like nodes and/or other devices in the mesh network. The radio of each node may have a programmable logic controller (PLC)-like device that can enable the radio to function like a computer, carrying out computer and command functions to provide implementations of the present invention described herein. A node may also include a storage medium for storing information related to communication with other nodes. Such storage mediums can include a memory, a floppy disk, CD-ROM, DVD, or other storage devices located internal to the node or accessible by the node via a network, for example. A node may also include a crystal oscillator (i.e. a clock) to provide time-keeping and a battery to provide back-up power. Some nodes may be powered only by a battery.

A node can communicate with other nodes in the mesh network over various frequency channels. Nodes that share the same channel hopping sequence, i.e., hop between frequencies at the same time, can communicate with each other over the same frequency. Thus, in a TSCH network, nodes can hop at different times to establish communication with other nodes over the available frequency spectrum, e.g., 4 channels according to an exemplary implementation. A node can hop according to a certain time increment or dwell time, e.g., 700 milliseconds, at which time the node can transmit or receive a message over a given channel or frequency. The hopping sequence length used may be a multiple of the number of channels in order to promote some overlap in hopping sequences. For example, if there are 4 channels, then the hopping sequence length could be a multiple of 4, such as 12, so that there are 12 slots or positions in the hopping sequence. This will provide a better chance that some overlap occurs in the hopping sequence of geographically close collectors, while still providing randomization for non-interference.

As used herein, a "collector node" refers to a node used to route messages within the network, as well as between the network and other networks, such as a control center. A node may be referred to as "active" on or "associated" with a given collector when the node is part of the network of the collector.

As used herein, "status data" refers to information communicated in a message or sequence of messages from which a node may obtain network status information associated with a given collector. The status data may be received by the node either directly from a collector or through one or more intervening nodes. In some embodiments of a network defined by IEEE 802.15.4e, the status data may be carried by a beacon. The beacon may be transmitted on a schedule-driven and/or event-driven basis.

As used herein, a "channel hopping sequence" or simply "hopping sequence" refers to a sequence of channels that may be used by devices for communicating via a channel hopping network. A channel hopping sequence may include a concatenation of two or more sequences of channel numbers, where each of these sequences may be referred to as a "segment" of the channel hopping sequence.

As used herein, a "segment boundary" refers to a point at which two sequences are concatenated to form all or part of a channel hopping sequence. That is, the point at which two segments of a channel hopping sequence meet. At each segment boundary, the last position of a segment of a channel hopping sequence is logically adjacent to the first position of the next segment of the channel hopping sequence.

As used herein, the "endpoints" of a channel hopping sequence refer to the first and last positions of a channel hopping sequence.

Referring now to the drawings, FIG. 1 depicts an exemplary mesh network 10 configured to implement the operations described herein. The mesh network 10 includes a collector node 19, radio nodes 21-28, status data 119, and possibly other components not shown. The collector node 19 can serve as a collection point to which the nodes 21-28 may send information, such as measurements of the consumption of gas, water, or electric power at a facility associated with the node. Nodes 21-28, as previously discussed, can have sufficient networking and computing capability to communicate with other nodes in the mesh network and to make intelligent determinations to facilitate such communication.

The collector node 19 can be configured to have at least the same functionality and capabilities present in nodes 21-28. Additionally, the collector node 19 may include sufficient storage capability for storing information from nodes 21-28 and, in some examples, greater computing capability to process the information received from the nodes. In other examples, a command center or other computing device (not shown) can be used to process the information received from the nodes.

The status data 119 for the network 10 may be originated by the collector 19 and used by prospective nodes, such as the node 28, to discover the network 10, as well as maintaining synchronization among nodes currently active on the network, such as the nodes 21-27. The information in the status data 119 may include one or more network identifiers, a seed value, time synchronization data, and/or other status information as can be appreciated. The network identifier identifies the network 10 with which the status data 119 is associated. The seed value allows a channel hopping sequence for the network 10 to be derived by prospective nodes seeking to join the network. The time synchronization data allows the nodes of the network to maintain synchronization among the clocks used by the radios of the nodes. One example of the status data 119 is a beacon or enhanced beacon.

Next, an exemplary illustration is provided for the operations related to generating a channel hopping sequence that may be implemented in the collector 19 and/or nodes 21-28 of the network 10. For purposes of this illustration, the operations that may be carried out in node 28 will be described, though it is understood that similar operations may be carried out in any of the devices of the network 10. To begin, node 28 receives status data 119 from the collector 19 or a node connected to the collector 19. The status data 119 may be transmitted on one or more channels of the network 10 upon a schedule-driven and/or event-driven basis. At the time the status data 119 is received, the node 28 may not be associated with any network or may be associated with a different network than the network 10. The node 28 may obtain the status data 119 for the network 10, a network on which the node 28 is not yet active, by scanning one or more channels that may vary over time, listening on a designated channel, and/or through other possible techniques.

From the status data 119, the node 28 may obtain a seed value for the network 10. Collectors, such as the collector 19, may originate transmission of the status data for a given network. If it is a collector instead of a node that needs to generate a channel hopping sequence, the seed value may first be generated by the collector or obtained through other operations. Using the seed value and the channel numbers to be included in the sequence, a plurality of sequences of channel numbers may be created, such as shown in FIG. 2. In the illustrative example of FIG. 2, shown are three sequences, where each sequence is made up of four channels, channels 4-7. In various embodiments, the sequence generation operations may be configured to produce sequences having one or more of various characteristics such as: not repeating a channel number within a sequence, all sequences being a fixed length, a minimum sequence length, each of the sequences use all of a set of available channels, each sequence generated using a different seed value, and/or other possible characteristics.

Throughout this disclosure, the illustrative examples presume that the generated sequences have the characteristics that no channels repeat within each sequence and that each sequence is made up of at least three channels. The seed value may be used in combination with one or more "sequence generators" that are implemented using preprogrammed mathematical operations, such as polynomial functions, to generate the sequences. One example of a sequence generator could be a linear feedback shift register (LFSR) implementing the polynomial function ($x^{16}+x^{11}+1$) to produce a sequence using the seed value as input. In the event that a different seed value is used to generate each sequence, the seed values may be provided in the status data 119 or may be derived from a single seed value through other preprogrammed mathematical operations. As an example of the latter, the nodes may generate a first sequence using the seed value received in the status data, generate a second sequence using a second seed value that is the first seed value shifted by four bits, generate a third sequence using a third seed value that is the second seed value with a bitwise NOT operation applied, etc.

Thereafter, the node 28 may concatenate the various sequences into a channel hopping sequence, such as shown in FIG. 3. The hopping sequence shown in FIG. 3 is a result of a possible concatenation of the three sequences shown in FIG. 2. Each of the individual sequences that are concatenated to make up a hopping sequence may be referred to as a "segment" of the hopping sequence. At this stage, the hopping sequence may be referred to as a candidate hopping sequence because it has not yet been examined by the node 28 to determine if adjacent repeating channels now exist as a result of the concatenation. If so, the position of at least one of the adjacent repeating channel numbers is adjusted to separate the channel numbers. Hopping sequences that have adjacent repeating channels diminish some of the benefits of implementing channel hopping, such as reduced interference. As a result, a hopping sequence having no adjacent channels in the sequence that repeat is desirable.

In the example shown in FIG. 3, the channels of the hopping sequence that are adjacent to the same channel have been emphasized and occur at positions 1 and 12, positions 4 and 5, and positions 8 and 9. It should be noted that when employed in a network, such as the network 10, use of a hopping sequence is typically repeated circularly such that subsequent to use of the channel in the last position in the hopping sequence, the channel in the first position in the hopping sequence is then used. In light of this configuration, the first and last positions of a hopping sequence are considered to be adjacent positions for the purposes of eliminating adjacent repeating channels.

Continuing, in FIG. 4 shown is an example of possible adjustments to be made to a hopping sequence in order to eliminate the adjacent repeating channels shown in FIG. 3. In order to eliminate the adjacent repeating channel 4 occurring in the first and last positions (i.e. positions 1 and 12) of the hopping sequence in FIG. 3, the emphasized channels in the last two positions of the hopping sequence (i.e. positions 11 and 12) in FIG. 4 have been swapped. In order to eliminate the adjacent repeating channel 6 at the boundary between segments 1 and 2 of the hopping sequence (i.e. positions 4 and 5) in FIG. 3, the emphasized channels in the last two positions of segment 1 (i.e. positions 3 and 4) in FIG. 4 have been swapped.

Similarly, in order to eliminate the adjacent repeating channel 7 at the boundary between segments 2 and 3 of the hopping sequence (i.e. positions 8 and 9) in FIG. 3, the emphasized channels in the last two positions of segment 2 (i.e. positions 7 and 8) in FIG. 4 have been swapped. It should be noted that while the particular positions chosen in FIG. 4 to be swapped, other positions could have instead been swapped instead to eliminate a particular repeating adjacency with equivalent results, as disclosed herein in connection with FIG. 6. In order to properly interoperate, the particular position swapping operations applied to remove the adjacent repeating channels should be consistent among the nodes 21-28 and other devices of the network 10.

Figure 5:
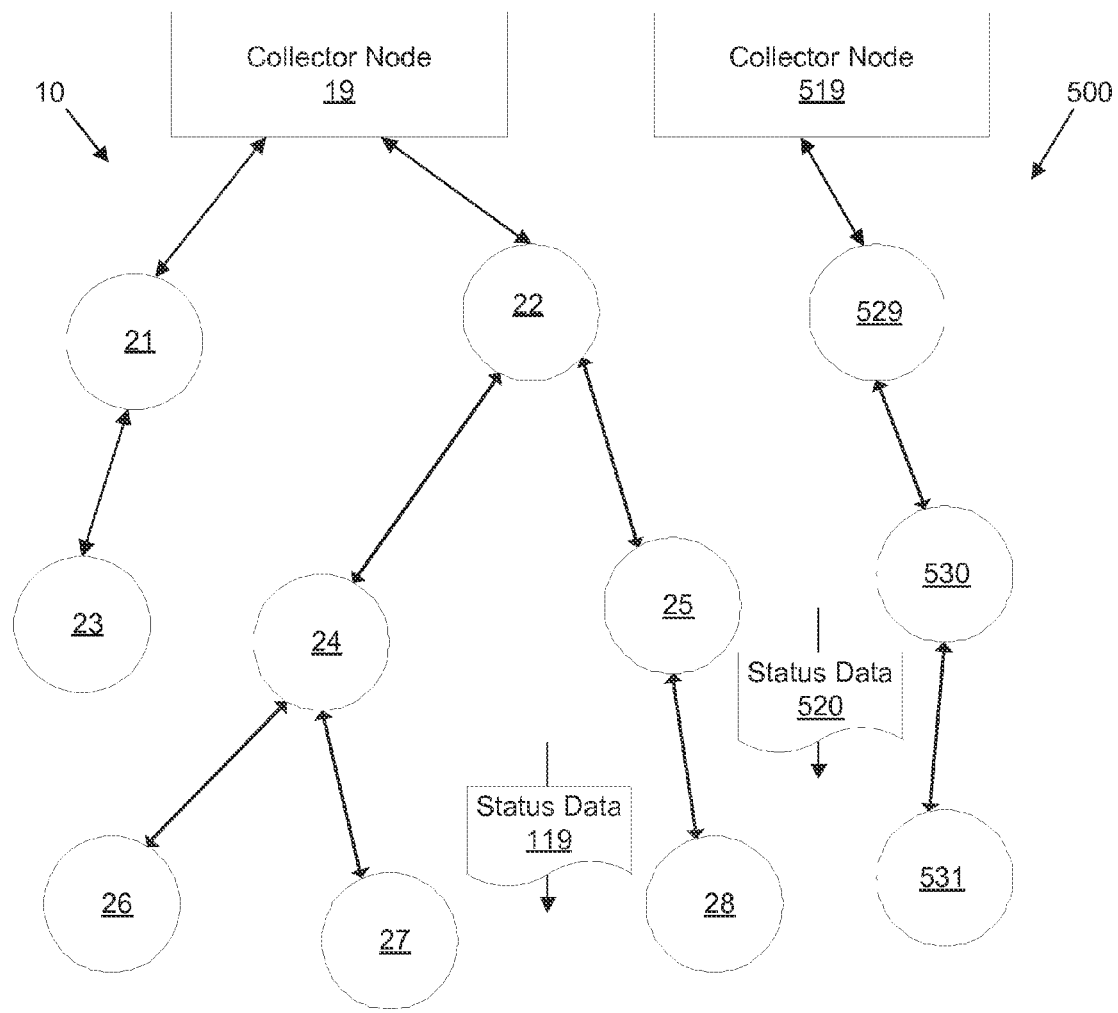
FIG. 5 is another drawing of a mesh network according to various embodiments of the present disclosure.

Upon making the adjustments to the channel hopping sequence, the node 28 may use the hopping sequence to configure its network interface to communicate on the network 10. In some embodiments, the node 28 may store the hopping sequence for later use as illustrated in the example of FIG. 5. In FIG. 5, shown is the collector 19, nodes 21-28, and status data 119 as discussed previously with regard to FIG. 1. However, in FIG. 5, node 28 has now joined network 10, via the link with node 25, after configuring its network interface with the hopping sequence for network 10 derived from the seed value of the status data 119. In addition, FIG. 5 includes another network 500 made up of a collector 519 and nodes 529-531. The status data 520 for the network 500 may be originated by the collector 519 and used by prospective nodes, such as the node 28, to discover the neighboring network 500, as well as maintaining synchronization among nodes currently active on the network 500, such as the nodes 529-531.

While active on the network 10, the node 28 may adhere to the hopping sequence for network 10. However, the node 28 may obtain the status data 520 for the network 500, a network on which the node 28 is not active, through probabilistic overlap of the channels of the two networks at some given time, periodically listening on a designated channel, and/or other possible techniques. Overlapping channels between the two networks would occur as a result of the same channel being used in the channel hopping sequences of the network 10 and network 500 at the same period of time. One benefit to using randomized, long channel hopping sequences is that it improves the likelihood of occasional overlap among channels in order for nodes to discover other neighboring networks. These neighboring networks may offer a failover choice and/or improved performance from the network on which a given node is presently active.

For example, starting at a fixed time, the hopping sequence for network 10 may be [4 5 6 7 6 4 7 5 7 6 4 5], while the hopping sequence for network 500 is [5 6 7 4 5 7 4 6 7 5 6 4]. In these two hopping sequences, the channels are different in each of the 12 positions except the ninth position in the sequences at which both networks are using channel 7 as emphasized above. During this time, the node 28 may receive the status data 519 for the network 500 if it is transmitted by the network 500 at this time. Once the status data 519 is received with a seed value, the node 28 may derive the hopping sequence for the network 500 as disclosed herein. Thereafter, the node 28 may store the hopping sequence for the network 500, where it may later be used to configure the network interface of the node 28. In some embodiments, using various other data that may be contained within the status data 500, the node 28 may compare the performance of the network 500 with the current network 10 to select a preferred network and/or determine if the network 500 is a suitable failover selection in the event the network 10 is disrupted.

Figure 6:
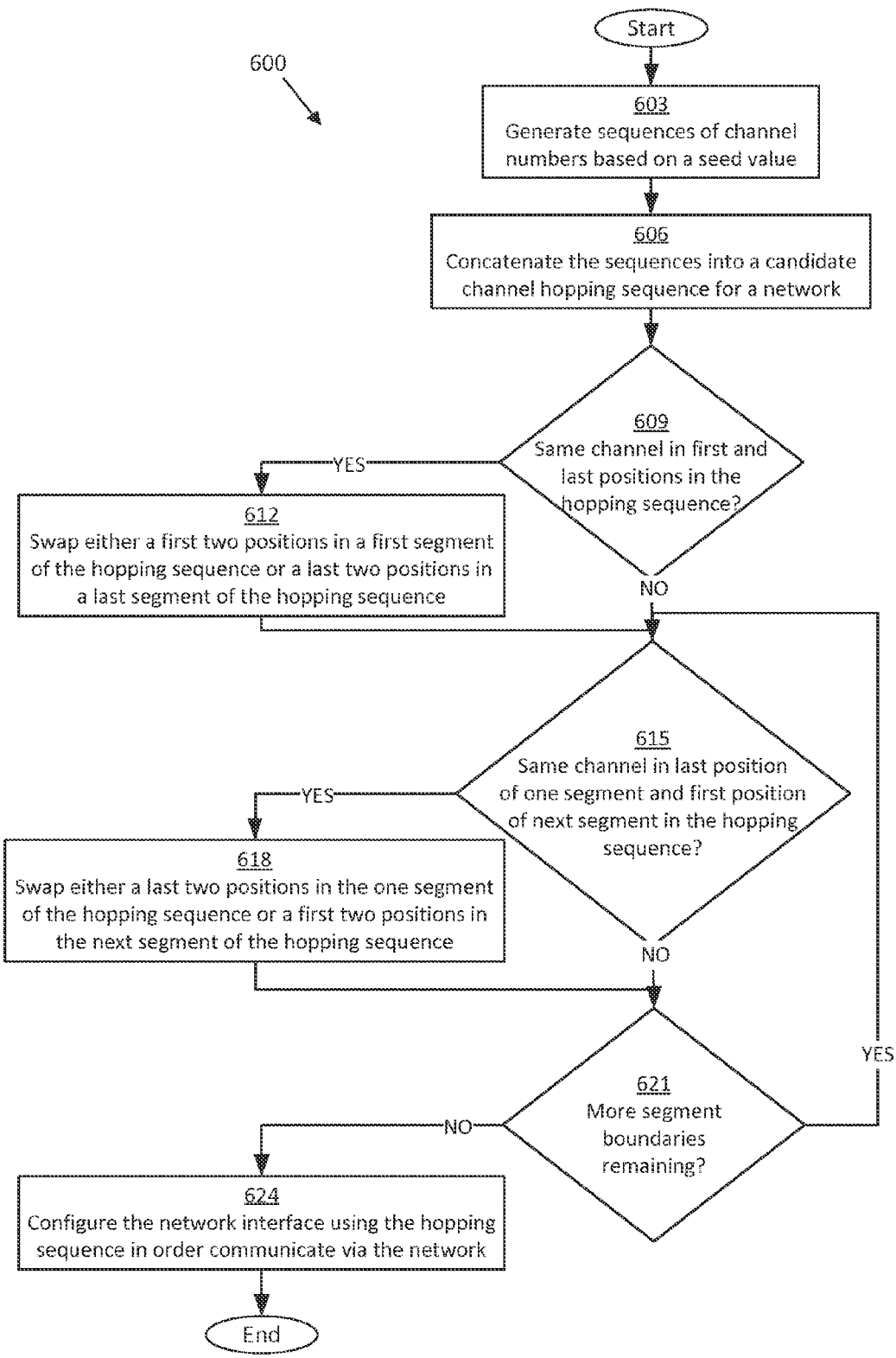
FIG. 6 is a flowchart illustrating one example of functionality implemented by a network device, such as a node, in the mesh network of FIG. 1 according to various embodiments of the present disclosure.

Referring next to FIG. 6, shown is a flowchart that provides one example of the channel hopping sequence generation operations for a method 600 of a collector and/or node in a TSCH network, such as the network 10, according to various embodiments. It is understood that the flowchart of FIG. 6 provides merely an example of the many different types of functional arrangements that may be employed to implement the network optimization operations of the method 600 as described herein. The exemplary operations depicted in the flowchart of FIG. 6 are initiated by a collector and/or node in a network after obtaining a seed value. As described previously, a node, such as the nodes 21-28, may obtain the seed value from status data transmitted for the network. Collectors, such as the collector 19, may locally generate the seed value or may be configured with the seed value, and will transmit the seed value in status data for the network orchestrated by the collector.

Beginning with block 603, the method 600 creates a plurality of sequences of channel numbers based at least in part upon the seed value. The seed value may be used in combination with one or more preprogrammed mathematical operations to generate the sequences. In various embodiments, the sequence generation operations may be configured to produce sequences having one or more of various characteristics such as: not repeating a channel number within a sequence, all sequences being a fixed length, a minimum sequence length, each of the sequences use all of a set of available channels, each sequence generated using a different seed value, and/or other possible characteristics. In the event that a different seed value is used to generate each sequence, the seed values may be provided in status data for the network or may be derived from a single seed value. For example, three sequences each with three channel numbers may be generated, where: Sequence 1=[1 2 3], Sequence 2=[3 2 1], and Sequence 3=[2 3 1].

Next, in block 606, the various sequences are concatenated into a channel hopping sequence. Each of the individual sequences that are concatenated to make up a channel hopping sequence may be referred to as a "segment" of the channel hopping sequence. At this stage, the hopping sequence may be referred to as a candidate hopping sequence because it has not yet been examined to determine if adjacent repeating channels now exist as a result of the concatenation. If adjacent repeating channels exist, the position of at least one of the adjacent repeating channel numbers is adjusted to separate the channel numbers. Channel hopping sequences having adjacent repeating channels diminish some of the benefits of implementing channel hopping, such as reduced interference. As a result, a hopping sequence having no adjacent channels in the sequence that repeat is desirable. For example, a possible concatenation of the three sequences in the previous example (Seq. 1+Seq. 2+Seq. 3) would produce Hopping Sequence of [1 2 3 3 2 1 2 3 1].

Continuing, in block 609, the hopping sequence is examined to determine whether the same channel is in the first and last positions of the hopping sequence. It should be noted that when employed in a network, such as the network 10, use of a hopping sequence is typically repeated circularly such that subsequent to use of the channel in the last position in the hopping sequence, the channel in the first position in the sequence is then used. In light of this configuration, the first and last positions of a hopping sequence are considered to be adjacent positions for the purposes of eliminating adjacent repeating channels. Returning to the previous example having the Hopping Sequence [1 2 3 3 2 1 2 3 1], the first and last positions of the Hopping Sequence emphasized above repeat the channel 1.

If the same channel is detected in the first and last positions of the hopping sequence, the method 600 proceeds to block 612. Alternatively, if different channels are detected in the first and last positions of the hopping sequence, the method 600 proceeds to block 615. In block 612, the method 600 swaps either the first two positions in the first segment of the hopping sequence or the last two positions in the last segment of the hopping sequence. Returning to the example, the Hopping Sequence would be adjusted to be either [2 1 3 3 2 1 2 3 1] by adjusting the first two positions of the first segment as emphasized, or [1 2 3 3 2 1 2 1 3] by adjusting the last two positions of the last segment as emphasized. It should be noted that in order to properly interoperate, the particular position swapping operations applied to remove the adjacent repeating channels should be consistent among the nodes, collectors, and other devices of the network.

Next, in block 615, the method 600 determines if the same channel exists in the last position of one segment and in the first position of the next segment. Continuing the example using the Hopping Sequence [2 1 3 3 2 1 2 3 1] initially created from three segments of three channels each, the last position of the first segment and first position of the second segment repeat the channel 3 as emphasized above. If the same channel exists in the last position of one segment and in the first position of the next segment, the method 600 proceeds to block 618. Alternatively, if different channels are detected in the last position of the one segment and in the first position of the next segment, the method 600 proceeds to block 621.

In block 618, the method 600 swaps either the last two positions in the one segment of the hopping sequence or the first two positions in the next segment of the hopping sequence. Returning to the example, the Hopping Sequence [2 1 3 3 2 1 2 3 1] would be adjusted to be either [2 3 1 3 2 1 2 3 1] by adjusting the last two positions of the first segment as emphasized, or [1 2 3 2 3 1 2 1 3] by adjusting the first two positions of the last segment as emphasized. It should be noted that in order to properly interoperate, the particular position swapping operations applied to remove the adjacent repeating channels should be consistent among the nodes, collectors, and other devices of the network.

Then, in block 621, the method 600 determines whether more segment boundaries remain in the hopping sequence to be examined. Returning to the example Hopping Sequence created from a concatenation of three sequences, the first segment boundary between the first and second segments was examined and adjusted, but an additional segment boundary exists between the second and third segments of the Hopping Sequence. However, using the Hopping Sequence of [2 3 1 3 2 1 2 3 1], the same channel does not exist at the boundary positions of the second and third segment emphasized above, thus no further adjustments are needed.

Continuing, if more segments boundaries remain to be examined, execution of the method 600 returns to block 615. Alternatively, execution of the method 600 proceeds to block 624. In block 624, the method 600 may use the hopping sequence, having been adjusted to remove adjacent repeating channels, to configure the network interface to communicate with other devices in the network that also use the hopping sequence. In some embodiments, nodes or other devices may first store the hopping sequence for possible later use.

Figure 7:
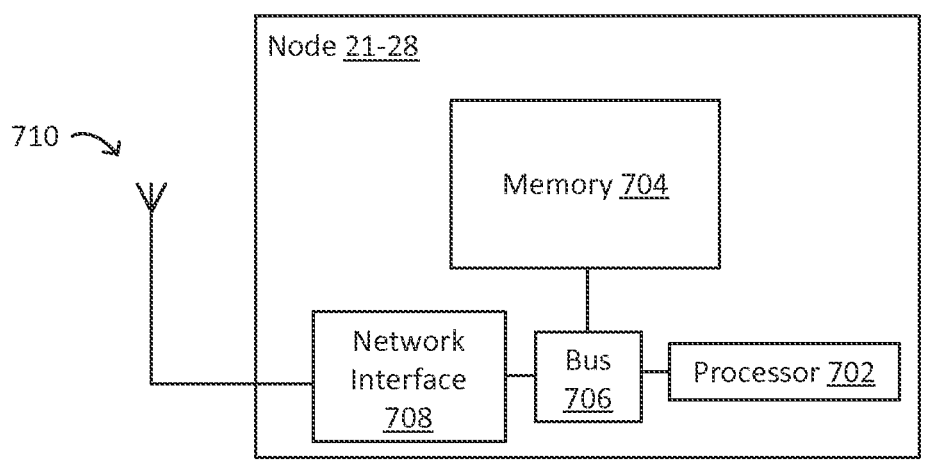
FIG. 7 is a schematic block diagram that provides one example illustration of a node employed in the mesh network of FIG. 1 according to various embodiments of the present disclosure.

Next, in FIG. 7, shown is a block diagram depicting an example of a node 21-28 used for implementing the techniques disclosed herein within a wireless mesh network or other data network. The node 21-28 can include a processing device 702. Non-limiting examples of the processing device 702 include a microprocessor, an application-specific integrated circuit ("ASIC"), a state machine, or other suitable processing device. The processing device 702 can include any number of processing devices, including one. The processing device 702 can be communicatively coupled to computer-readable media, such as memory device 704. The processing device 702 can execute computer-executable program instructions and/or access information respectively stored in the memory device 704.

The memory device 704 can store instructions that, when executed by the processing device 702, cause the processing device 702 to perform operations described herein. The memory device 704 may be a computer-readable medium such as (but not limited to) an electronic, optical, magnetic, or other storage device capable of providing a processor with computer-readable instructions. Non-limiting examples of such optical, magnetic, or other storage devices include read-only ("ROM") device(s), random-access memory ("RAM") device(s), magnetic disk(s), magnetic tape(s) or other magnetic storage, memory chip(s), an ASIC, configured processor(s), optical storage device(s), or any other medium from which a computer processor can read instructions. The instructions may comprise processor-specific instructions generated by a compiler and/or an interpreter from code written in any suitable computer-programming language. Non-limiting examples of suitable computer-programming languages include C, C++, C#, Visual Basic, Java, Python, Perl, JavaScript, and the like.

The nodes 21-28 can include a bus 706 that can communicatively couple one or more components of the node 21-28. Although the processor 702, the memory 704, and the bus 706 are depicted in FIG. 7 as separate components in communication with one another, other implementations are possible. For example, the processor 702, the memory 704, and the bus 706 can be components of printed circuit boards or other suitable devices that can be disposed in a node 21-28 to store and execute programming code.

The nodes 21-28 can also include network interface device 708. The network interface device 708 can be a transceiving device configured to establish a one or more of the wireless communication links via an antenna 710. A non-limiting example of the network interface device 708 is an RF transceiver and can include one or more components for establishing a communication link to other nodes 21-28 in the mesh network 10.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other storage devices, transmission devices, or display devices of the computing platform.

The system or systems discussed herein are not limited to any particular hardware architecture or configuration. A computing device can include any suitable arrangement of components that provide a result conditioned on one or more function calls. Suitable computing devices include multipurpose microprocessor-based computer systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation, and does not preclude inclusion of such modifications, variations, and/or additions to the present subject matter as would be readily apparent to one of ordinary skill in the art.

Therefore, the following is claimed:

1. A method for determining a hopping sequence for a network, comprising:
  generating, in a node, a plurality of sequences of channel numbers based at least in part upon a seed value received in a message via the network;
  concatenating, in the node, the sequences into a candidate hopping sequence, wherein each of the sequences is a segment of the candidate hopping sequence;
  adjusting the candidate hopping sequence to generate the hopping sequence, by:
    adjusting endpoints of the candidate hopping sequence by swapping, in the node, either a first two positions in a first segment of the candidate hopping sequence or a last two positions in a last segment of the candidate hopping sequence, when a first position of the candidate hopping sequence is the same channel number as a last position of the candidate hopping sequence; and
    adjusting a segment boundary point of the candidate hopping sequence by swapping, in the node, either a last two positions in one segment of the candidate hopping sequence or a first two positions in a next segment of the candidate hopping sequence, when a last position in the one segment of the candidate hopping sequence is the same channel number as a first position in the next segment of the candidate hopping sequence; and configuring a network interface of the node using the hopping sequence in order to communicate via the network.

2. The method of claim 1, wherein each of the sequences has one or more of the characteristics of: a length of at least three, each of the positions within the sequence has a different channel number, and a length equal to a number of unique channel numbers within a set of available channels.

3. The method of claim 1, wherein said generating the sequences uses a different seed value for each of the sequences, each of the different seed values being based at least in part upon the seed value.

4. The method of claim 1, further comprising receiving, in the node, another message from another network accessible to the node, wherein the other message comprises another seed value from which the node can configure the network interface to communicate on the other network.

5. The method of claim 1, wherein the hopping sequence is the candidate hopping sequence.

6. The method of claim 1, further comprising:
wherein the candidate hopping sequence comprises three or more segments,
repeating said adjusting the segment boundary point for each of a plurality of segment boundaries in the candidate hopping sequence.

7. A non-transitory computer-readable medium embodying a program executable by a processor of a computing device, wherein the program comprises code that:
generates a plurality of sequences of channel numbers based at least in part upon a seed value;
concatenates the sequences into a candidate hopping sequence for a network, wherein each of the sequences is a segment of the candidate hopping sequence;
adjusts the candidate hopping sequence to generate a hopping sequence for the network, by:
adjusting endpoints of the candidate hopping sequence by swapping either a first two positions in a first segment of the candidate hopping sequence or a last two positions in a last segment of the candidate hopping sequence, when a first position of the candidate hopping sequence is the same channel number as a last position of the candidate hopping sequence; and
adjusting a segment boundary point of the candidate hopping sequence by swapping either a last two positions in one segment of the candidate hopping sequence or a first two positions in a next segment of the candidate hopping sequence, when a last position in the one segment of the candidate hopping sequence is the same channel number as a first position in the next segment of the candidate hopping sequence; and
configures a network interface of the computing device using the hopping sequence in order to communicate via the network.

8. The non-transitory computer-readable medium of claim 7, wherein the sequences comprise a first sequence and a second sequence, the first sequence generated using a sequence generator configured with the seed value, and the second sequence generated using the sequence generator configured with a second seed value that is different than the seed value.

9. The non-transitory computer-readable medium of claim 7, wherein the program further comprises code that transmits the seed value in a beacon for the network.

10. The non-transitory computer-readable medium of claim 7, wherein each of the sequences have a length of at least three channel numbers.

11. The non-transitory computer-readable medium of claim 7, wherein said adjusting the segment boundary point comprises adjusting the segment boundary point for every segment boundary in the candidate hopping sequence.

12. The non-transitory computer-readable medium of claim 7, wherein said generating the sequences uses a different seed value for each of the sequences, each of the different seed values being based at least in part upon the seed value.

13. The non-transitory computer-readable medium of claim 7, wherein a length of each of the sequences is equal to a count of possible channel numbers.

14. The non-transitory computer-readable medium of claim 7, wherein the seed value is received, via the network, in a beacon.

15. The non-transitory computer-readable medium of claim 7, wherein the program further comprises code that receives status data for another network accessible to the node, wherein the status data comprises another seed value from which the node can configure the network interface to communicate on the other network.

16. A node, comprising:
a processor;
a network interface configured to receive status data for a network, the status data including a seed value; and
a memory configured by a network application executed in the node, the network application causing the node to:
generate a plurality of sequences of channel numbers based at least in part upon the seed value;
concatenate the sequences into a candidate hopping sequence for the network, wherein each of the sequences is a segment of the candidate hopping sequence;
adjust the hopping sequence to generate a hopping sequence for the network, by:
adjusting endpoints of the candidate hopping sequence by swapping either a first two positions in a first segment of the candidate hopping sequence or a last two positions in a last segment of the candidate hopping sequence, when a first position of the candidate hopping sequence is the same channel number as a last position of the candidate hopping sequence; and
adjusting a segment boundary point of the candidate hopping sequence by swapping either a last two positions in one segment of the candidate hopping sequence or a first two positions in a next segment of the candidate hopping sequence, when a last position in the one segment of the candidate hopping sequence is the same channel number as a first position in the next segment of the candidate hopping sequence; and
configure the network interface using the hopping sequence in order to communicate via the network.

17. The node of claim 16, wherein the network application further comprises receiving other status data for another network accessible to the node, wherein the other status data comprises another seed value from which the node can configure the network interface to communicate on the other network.

18. The node of claim 16, wherein the candidate hopping sequence comprises three or more segments, and the network application further comprises repeating said adjusting the segment boundary point for each of a plurality of segment boundaries in the candidate hopping sequence.

19. The node of claim 16, wherein within each of the sequences, each of the positions has a different channel number.

20. The node of claim 16, wherein said generating the sequences uses a different seed value for each of the sequences, each of the different seed values being based at least in part upon the seed value.

* * * * *